United States Patent
Jantzon

(10) Patent No.: US 11,885,454 B2
(45) Date of Patent: Jan. 30, 2024

(54) BLADDER SAVER DEVICE

(71) Applicant: Performance Pulsation Control, Inc., Richardson, TX (US)

(72) Inventor: Cersten Jantzon, Houston, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 450 days.

(21) Appl. No.: 17/135,727

(22) Filed: Dec. 28, 2020

(65) Prior Publication Data

US 2021/0199227 A1 Jul. 1, 2021

Related U.S. Application Data

(60) Provisional application No. 62/954,216, filed on Dec. 27, 2019.

(51) Int. Cl.
| | |
|---|---|
| *F16L 55/04* | (2006.01) |
| *F16L 55/053* | (2006.01) |
| *E21B 21/00* | (2006.01) |
| *B01D 35/28* | (2006.01) |
| *F16L 55/027* | (2006.01) |
| *E21B 47/18* | (2012.01) |

(52) U.S. Cl.
CPC ............ *F16L 55/053* (2013.01); *B01D 35/28* (2013.01); *E21B 21/00* (2013.01); *F16L 55/02718* (2013.01); *E21B 47/18* (2013.01)

(58) Field of Classification Search
CPC .......................... F16L 55/053; F16L 55/02718
USPC ................................ 137/825; 138/30, 31, 43
See application file for complete search history.

(56) References Cited

U.S. PATENT DOCUMENTS

| | | | | |
|---|---|---|---|---|
| 2,072,634 | A * | 3/1937 | Griffith ................ | A62C 35/645 169/17 |
| 2,385,016 | A * | 9/1945 | Mercier ................... | F15B 1/18 251/297 |
| 2,922,055 | A * | 1/1960 | Deters .................. | H02K 5/1285 310/87 |
| 3,431,944 | A * | 3/1969 | Masao .................... | F16K 1/126 137/529 |
| 3,722,548 | A * | 3/1973 | Mercier ............... | F16L 55/052 92/92 |
| 4,320,778 | A * | 3/1982 | Baumann ................ | F16K 47/04 137/454.6 |

(Continued)

FOREIGN PATENT DOCUMENTS

| | | |
|---|---|---|
| CN | 103994254 A | 8/2014 |
| GB | 762197 A | 11/1956 |

OTHER PUBLICATIONS

Notification of Transmittal of the International Preliminary Report on Patentability (Chapter II of the Patent Cooperation Treaty) dated Dec. 30, 2021 in connection with International Patent Application No. PCT/US20201067222, 18 pages.

(Continued)

*Primary Examiner* — James F Hook

(57) ABSTRACT

To inhibit damage to or failure of the bladder within a bladder-type pulsation dampener, an internal passage of a bladder saver device carrying pumped fluid from the pulsation bleed plate mounted within the internal passage and movable between a first position in which the pulsated fluid flow is unencumbered by the bleed plate and a second position in which the pulsated fluid flow is restricted by the bleed plate.

20 Claims, 11 Drawing Sheets

(56) References Cited

U.S. PATENT DOCUMENTS

| | | | | |
|---|---|---|---|---|
| 4,338,968 A | * | 7/1982 | Mercier | F15B 1/18 |
| | | | | 138/30 |
| 4,343,477 A | * | 8/1982 | Bridges | F16L 17/10 |
| | | | | 138/31 |
| 4,526,205 A | * | 7/1985 | Sugimura | F16L 55/053 |
| | | | | 138/30 |
| 5,036,879 A | | 8/1991 | Ponci | |
| 5,740,837 A | * | 4/1998 | Chiang | G05D 16/0402 |
| | | | | 138/45 |
| 6,332,477 B1 | * | 12/2001 | Scholl | F15B 1/24 |
| | | | | 138/30 |
| 2004/0020543 A1 | * | 2/2004 | Weber | F15B 1/165 |
| | | | | 138/30 |
| 2015/0198179 A1 | | 7/2015 | Lucas et al. | |
| 2018/0094648 A1 | | 4/2018 | Hoffman et al. | |
| 2018/0128410 A1 | | 5/2018 | Rogers | |

OTHER PUBLICATIONS

Notification of Transmittal of the International Search Report and the Written Opinion of the International Searching Authority, or the Declaration dated Mar. 25, 2021 in connection with International Patent Application No. PCT/US2020/67222, 10 pages.

Office Action dated Sep. 15, 2023, in connection with Canadian Application No. 3,166, 177, 4 pages.

* cited by examiner

BLADDER SAVER DEVICE

CROSS-REFERENCE TO RELATED APPLICATION AND CLAIM OF PRIORITY

This application claims priority under 35 U.S.C. § 119(e) to U.S. Provisional Patent Application No. 62/954,216 filed on Dec. 27, 2019. The above-identified provisional patent application is hereby incorporated by reference in its entirety.

TECHNICAL FIELD

The present application relates generally to gas-charged pulsation dampeners and, more specifically, to preserving the bladder within a gas-charged pulsation dampener.

BACKGROUND

Since oil and gas drilling has been focused on competitive drilling efficiencies, managed pressure drilling (MPD), measurement while drilling (MWD) and/or logging while drilling (LWD) tools and systems have been adopted in most exploration and production efforts for drilling a borehole. These MPD activities provide a closed-loop circulation system in which pore pressure, formation fracture pressure, and bottom-hole pressure are balanced and managed at the surface. Drilling fluid is supplemented by surface backpressure, which can be adjusted much faster in response to downhole conditions compared with changing mud weights conventionally. MWD/LWD systems employ low frequency pulsations emitted from an electromechanical device located in the bottom hole assembly (BHA) with three major subassemblies: the power system; the telemetry system; and a directional sensor. Telemetry may be electrical along hardwire connections, use low-frequency electromagnetic transmission, or use mud pulses.

Several attempts have been made to construct special drill pipe with an integral hardwire for electrical telemetry. Although offering exceptionally high data rates (data rates in excess of 2,000,000 bits/second have been demonstrated), the integral hardwire telemetry method requires: expensive, special drill pipe; special handling; and hundreds of electrical connections that must all remain reliable in harsh conditions.

Low-frequency electromagnetic transmission is in limited commercial use in MWD and LWD systems, sometimes used when air or foam is used as drilling fluid. The depth from which electromagnetic telemetry can be transmitted is limited by the conductivity and thickness of the overlying formations. Repeaters or signal boosters positioned in the drill string extend the depth from which electromagnetic systems can transmit reliably.

For mud-pulse telemetry, a standard method in commercial MWD and LWD telemetry systems, pump pulsation energies and associated mud noise significantly impact operation. Acoustic systems that transmit up the drill pipe suffer attenuation of approximately 150 decibels (dB) per 1000 meters of drilling fluid. Three mud-pulse telemetry systems are available: positive-pulse systems; negative-pulse systems; and continuous-wave systems. These systems are named for the ways in which their pulses are propagated in the mud volume. For example, negative-pulse systems create a pressure pulse lower than that of the mud volume by venting a small amount of high-pressure drill string mud from the drill pipe to the annulus. Positive-pulse systems create a momentary flow restriction (higher pressure than the drilling-mud volume) in the drill pipe. Continuous-wave systems create a carrier frequency that is transmitted through the mud, and they encode data using the phase shifts of the carrier. In addition, many different data-coding systems are used, which are often designed to optimize the life and reliability of the pulser, which must survive direct contact with the abrasive, high-pressure mud flow.

For mud-pulse telemetry, telemetry-signal detection is performed by one or more transducers located on the rig standpipe. Data are extracted from the signals by surface computer equipment housed either in a skid unit or on the drill floor. Successful data decoding is highly dependent on the signal-to-noise ratio. A close correlation exists between the signal size and the telemetry data rate; the higher the data rate, the smaller the pulse size becomes. Most modern systems have the ability to reprogram the tool's telemetry parameters and slow down data-transmission speed without tripping out of the hole. However, slowing the data rate adversely affects log-data density.

The most notable sources of signal noise for mud-pulse telemetry are the mud pumps, which often create a relatively high frequency noise. Interference among pump frequencies leads to harmonics, but such background noises can be filtered out with analog techniques. Pump-speed sensors can be a very effective method of identifying and removing pump noise from the raw telemetry signal. Lower-frequency noise in the mud volume is often generated by drilling motors. Well depth and mud type also affect the received-signal amplitude and width since, in general, oil-based muds (OBMs) and pseudo-oil-based muds are more compressible than water-based muds and therefore result in the greatest signal losses. Nevertheless, signals have been retrieved—with some difficulties—from depths to almost 9144 meters (m) (that is, 30,000 feet) in compressible fluids.

To maintain MWD efficiency, it is helpful to have a mud system that is running smoothly without producing harsh pulsations. Traditionally, mud pump manufacturers have contracted the supply of pulsation dampeners employed on the suction and discharge sides of each mud pump. Conventional designs use air capped stabilizers or bladder style, nitrogen-charged (or charge-free) discharge dampeners to address pulsation energies attributed to changes in flow. Other pulsation control techniques employ acoustic flow through devices in cellular and or liquid-only form, which flow-through systems focus on both flow variation and step changes in fluid flow that manifest in acceleration-induced pulsation energies. These acceleration-induced pulsations are typically high frequency noises in the mud system tend to cloud the MWD signals significantly, affecting drilling efficiencies.

For gas-charged pulsation dampeners used with MPD/MWD/LWD systems, these systems create a siphoning effect within the closed loop mud system that impacts service life of the bladder (or, equivalently, "diaphragm"). Beyond the pulsation energies inherent to steady-state operation of the closed loop mud system, the start-stop nature of drilling operations introduces additional flow disruption within the mud system, greatly affecting the service life of the pulsation control equipment. Within the closed loop mud system from the mud pump to the mud motor, anytime the mud pump operations are stopped for adding a drill pipe stand, MPD or MWD/LWD signal detection or other issues, there is a decoupling and a doubling back of the mud within the drill string. During such periods, there is a potential siphoning of the mud within traditional bladder style dampeners that pulls the bladder violently toward the small orifice connecting the dampener to the mud pump strainer cross. These forces are significant, with the bladder material often extruding around a molded in-place metal insert into the small orifice (typically 2 inches in diameter) to cause the bladder to stick or be damaged. A stuck bladder can trap from full vacuum to full discharge pressure on the gas side of the bladder, making it extremely dangerous to maintain (replace) the bladder. Even when the bladder does not get stuck in the pulsation dampener exit orifice, pressure surged may still cause the bladder to impact the dampener structure around that orifice and/or extrude somewhat into the orifice. Repeated impacts and/or deformations of that type can cause localized wear on the bladder material that results in failure (e.g., by rupture) of the bladder. Surges and other system interactions with reflected pressure waves substantially shortened bladder service life as well as Kelly hose and/or kicker hose service life. Since service life correlates significantly with performance and drilling efficiency, achieving longest service life is an important focus.

SUMMARY

To inhibit damage to or failure of the bladder within a bladder-type pulsation dampener, a bladder saver device is provided. The bladder saver device includes a housing and a bleed plate. The housing includes an internal passage for a pulsated fluid flow. The bleed plate is mounted within the internal passage and movable between a first position in which the pulsated fluid flow is unencumbered by the bleed plate and a second position in which the pulsated fluid flow is restricted by the bleed plate.

In certain embodiments, the bladder saver device is implemented in a system. The system includes a strainer cross, the bladder saver device, and a pulsation dampener. The strainer cross coupled to a pump discharge to filter large particles. The bladder saver device includes a housing and a bleed plate. The housing includes an internal passage for a pulsated fluid flow. The bleed plate is mounted within the internal passage and movable between a first position in which the pulsated fluid flow is unencumbered by the bleed plate and a second position in which the pulsated fluid flow is restricted by the bleed plate. The pulsation dampener coupled to the bladder saver device to be in fluid flow with the internal passage.

In certain embodiments, an integrated bladder saver device for use with a bladder-type pulsation dampener is provided. The integrated bladder saver device includes a strainer cross portion and a bladder saver portion. The strainer cross portion is coupled to a pump discharge to filter large particles. The bladder saver portion extending from the strainer cross portion to be in fluid flow with a cross fluid passage of the strainer cross portion. The bladder saver portion includes a housing and a bleed plate. The housing includes an internal passage for a pulsated fluid flow. The bleed plate is mounted within the internal passage and movable between a first position in which the pulsated fluid flow is unencumbered by the bleed plate and a second position in which the pulsated fluid flow is restricted by the bleed plate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged standpipe manifold dampener or system dampener that can be used to control or partially control pulsation amplitudes.

Reciprocating systems, such as reciprocating pump systems and similar equipment, operate in many types of cyclic hydraulic applications. For example, reciprocating mud pump systems are used to circulate the mud or drilling fluid on a drilling rig. Pressure peaks within the pumped fluid accelerate, with each pulsation, the deterioration of the pump, the pump's fluid end expendable parts, and equipment downstream from the pump, such as measurement equipment used to determine drilling parameters, and wash pipe and wash pipe packing. Failure to control such pressure peaks inevitably affect the operating performance and operational life of the pump, pump fluid end expendable parts and all upstream or downstream components. Pressure peaks may also interfere with instrument signal detection, such that failure to control pressure peaks may also affect the signal detection and/or quality of the signal detection in (for example) measurement while drilling operations.

Pulsation control equipment is typically placed immediately upstream or downstream from a reciprocating pump, often with a relative size and configuration proportional to the volume of desired fluid displacement per stroke of the pump and the maximum allotted magnitude of the pressure peaks that may be experienced by the pump system during each pulsation. Pulsation control equipment thus aids in reducing pump loads and minimizing pulsation amplitudes to the pump, the pump's fluid end expendable parts and to equipment upstream or downstream. As a result, pulsation control equipment increases the relative operating performance and life of the pump, the pump's fluid end expendable parts and any equipment upstream or downstream from the pump. In addition, drilling efficiency using MPD/MWD/LWD systems is impacted as discussed above.

The primary focus of the bladder saver device (BSD) is to ensure increased bladder life in the mud pump gas charged discharge dampener, thus reducing down or nonproductive time in drilling operations. The bladder saver device essentially allows the driller to continue their mode of operation and gain the highest drilling efficiencies in extended reach drilling programs. The bladder saver device may be a separate component or may be integrated into the design of a mud pump strainer cross. Unidirectional and bidirectional designs prevent bladder failure from one or both of sudden or repeated in-rush of fluid to and out-rush of fluids from the dampener.

Figure 1:
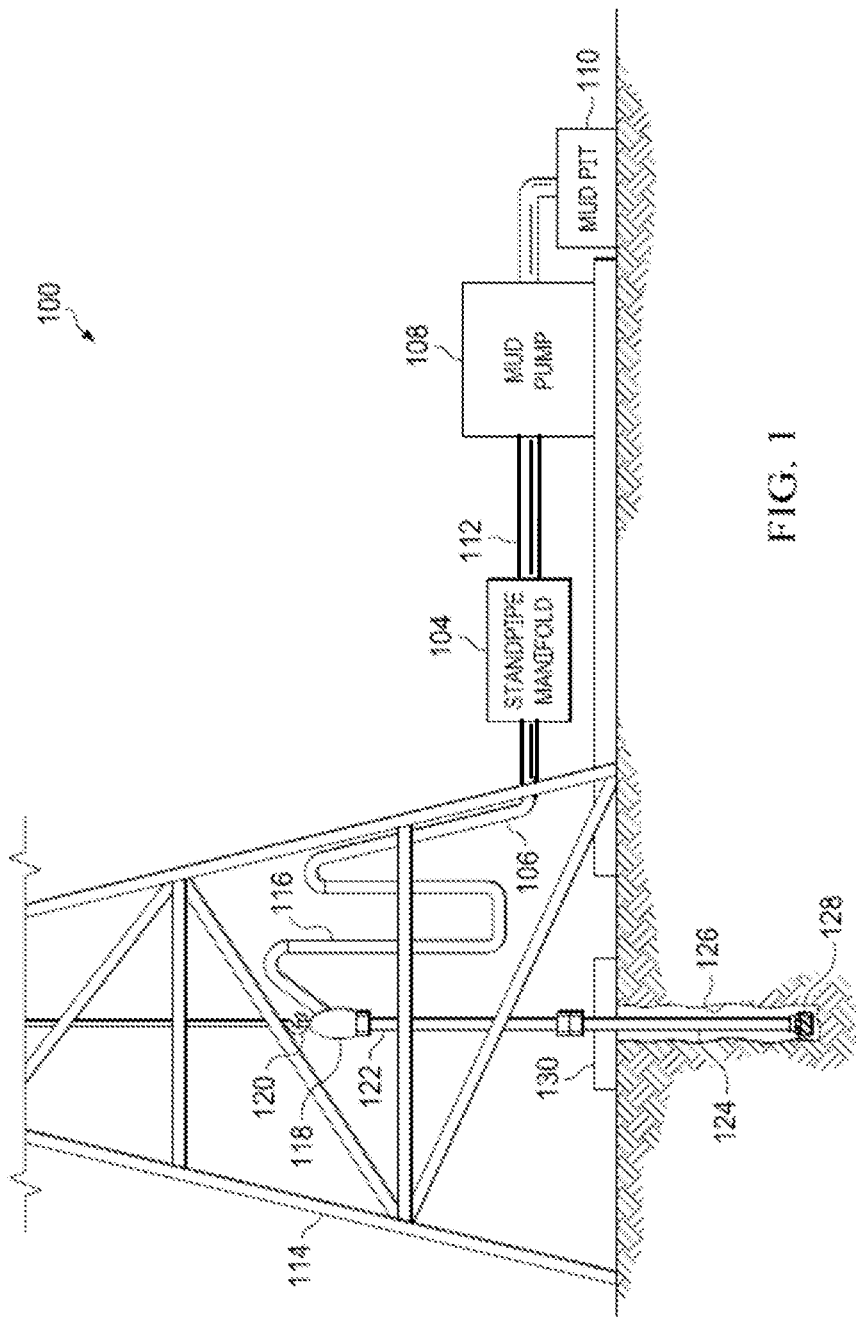
FIG. 1 illustrates a diagrammatic view of a drilling system including a pulsation dampener for which a bladder saver device according to various embodiments of the present disclosure.

FIG. 1 illustrates a diagrammatic view of a drilling system 100 including a pulsation dampener for which a bladder saver device according to various embodiments of the present disclosure. The embodiment of the drilling system 100 illustrated in FIG. 1 is for illustration only. FIG. 1 does not limit the scope of this disclosure to any particular implementation of a drilling system.

Referring now to FIG. 1, the drilling system 100 includes at least one standpipe manifold 104, at least one standpipe 106, at least one mud pump 108, at least one mud pit 110, at least one discharge line 112, and at least one drilling rig 114. The drilling system 100 operates to pump mud or other fluids down a well currently being drilled to keep a drill bit 128 from overheating, provide lubrication to the drill bit, and remove rock cuttings to the surface.

A fluid pump or mud pump 108 may pump fluid or mud from a mud pit 110 through a discharge line 112 in the direction of a drilling rig 114. More than one mud pump 108 can be utilized in a drilling system 100 to continue drilling upon the failure of a single mud pump 108. A pulsation dampener can be installed on the discharge line 112 for each mud pump 108 to further reduce pulsations. The mud pit 110 can also reference a fluid reservoir, where the fluid reservoir stores a fluid used during a drilling process.

Conventionally, a pulsation dampener is located along the discharge line 112, at the outlet of the mud pump 108 and before the standpipe manifold 104. The standpipe manifold 104 may be installed down the discharge line 112 and is attached to and/or coupled in fluid communication with the drilling rig 114. The standpipe manifold 104 may receive a plurality of different fluid streams from a plurality of mud pumps 108. The standpipe manifold 104 may then combine all of the fluid streams together to send a single fluid stream up the standpipe 106. Other functions traditionally performed by the standpipe manifold are to provide an auxiliary connection for a supplementary pump and, in systems with multiple standpipes providing operational redundancy in case of failure of one standpipe, to switch fluid flow paths from one standpipe to another. However, those skilled in the art understand that some systems dispense with the standpipe manifold, and simply bring the outlet flows of multiple mud pumps together in a single line somewhere near the mud pumps or downstream, with the combined flow then traveling in a single line to the substructure and upwards toward the standpipe, When the fluid streams from multiple mud pumps are combined (in a standpipe manifold or without one), the pulsations in the resulting combined fluid flow can be enlarged based on the different pulsations of the mud pumps 108 being used. For example, the different types or sizes of mud pumps 108 can be used in a single drilling system 100, which would cause variations or pulsations in the fluid flow through the pipe. The mud pumps 108 could also be located at different distances from the standpipe manifold 104. The mud pumps 108 could begin at different times, operating off cycle from other mud pumps 108, or simply be operating at different operating speeds. Any of the previous operating parameters would affect the flow of fluids or mud into the standpipe manifold 104 causing pulsations at the well.

The standpipe 106 may be installed on the drilling rig 114 and travel up the drilling rig 114 to provide the fluid stream through a rotary hose 116 connected to a swivel 118, the swivel 118 coupled to a rotary hook 120. The standpipe 106 receives discharge from the standpipe manifold, which includes a system pulsation dampener. The standpipe manifold 104 can include multiple discharges to the standpipe 106 in case of failure in part of the standpipe manifold 104 or associated pipeline.

The swivel 118 may serve as a passageway for the fluid stream into a Kelly drive 122 (or just "Kelly"). The Kelly 122 connects to a drill string 124. The fluid passes through the Kelly 122 and the drill string 124 down a bore hole 126 to a drill bit 128 disposed at a far end of the drill string 124. The Kelly 122 is typically rotated by a rotary table 130. More recent systems may include a top drive to rotate the drill string 124 as an alternative to the rotary table and Kelly drive, and the present disclosure is applicable to such top drive configurations as well.

In drilling systems, pulsation dampeners can be installed near the mud pump 108 to reduce pump loads and minimize pulsation amplitudes from the mud pump(s) 108. However, as fluid is combined at the standpipe manifold 104 into a single stream and sent to the standpipe 106, significant energy and pulsation amplitudes may be created by the combining of the streams from the mud pumps 108 or transferred directly to the standpipe 106, which is then transferred to the rest of the system downstream described herein. The pulsation amplitudes produced may be greater as more mud pumps 108 are used to provide fluid reaching the standpipe manifold 104, as pulsations from multiple pipes receiving fluid from multiple mud pumps 108 come together and accumulate at the standpipe manifold, which are then transferred to the standpipe 106. These pulsations can cause wear and damage to components, including the connections near the swivel 118, Kelly 122, and other components such as a wash pipe and wash pipe packing (seals) (both not shown) that serves as a conduit for fluid through the swivel 118. Instruments used for monitoring and measuring operations while drilling can also be affected by the residual pulsations from the mud pump 108. Even the smallest pulsations from the standpipe manifold can affect the measurement readings.

Figure 2:
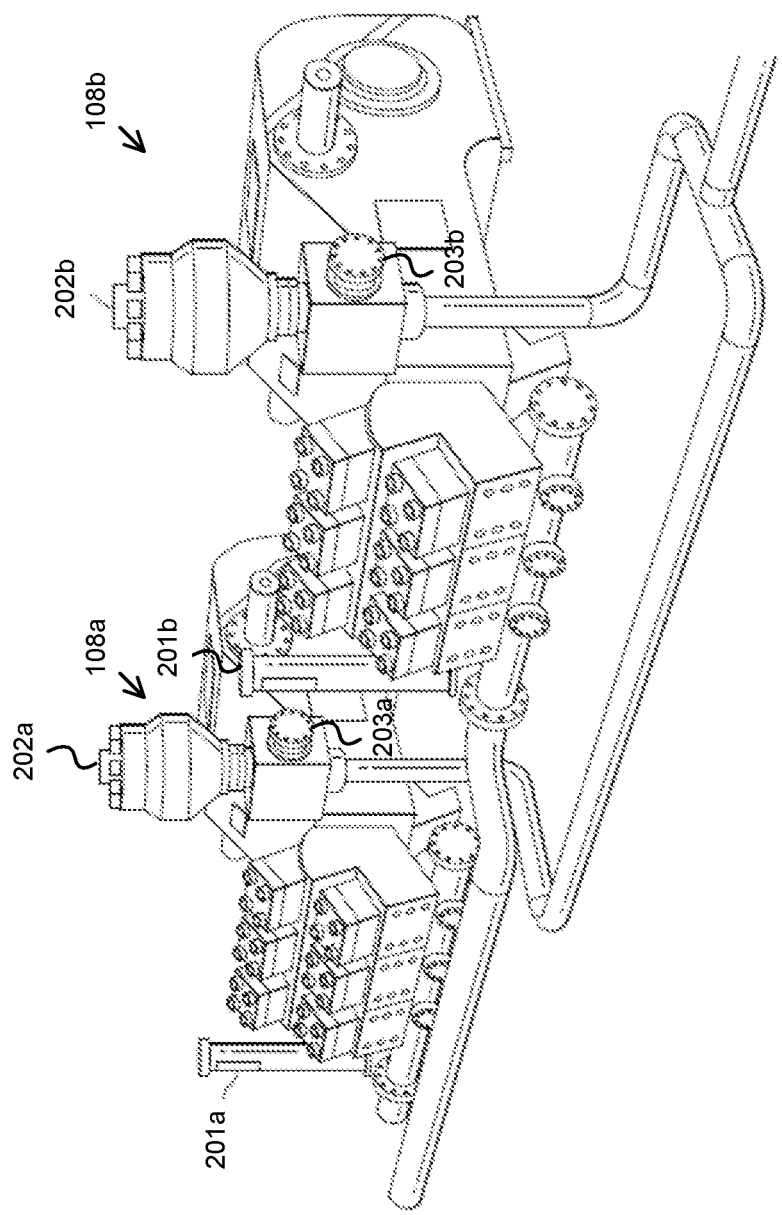
FIG. 2 illustrates a mud pump system pulsation dampener installation for which a bladder saver device may be employed in accordance with embodiments of the present disclosure.

A single mud pump 108 is depicted diagrammatically in FIG. 1. However, a drilling system may include multiple mud pumps with interconnected flows as depicted in FIG. 2 and described below. In addition, each mud pump includes a gas-charged pulsation dampener not shown in FIG. 1, constructed and operating as described in further detail below.

FIG. 2 illustrates a mud pump system pulsation dampener installation for which a bladder saver device may be employed in accordance with embodiments of the present disclosure. In the example illustrated, two three-cylinder pumps 108a, 108b having connected outputs each include a suction stabilizer 201a, 201b connected to the inlet and a gas-charged pulsation dampener 202a, 202b at the outlet. In such configurations, space and support are key and in/out flow-through piping is required.

Pulsation dampeners 202a, 202b are typically mounted to the top of a strainer cross 203a, 203b (also known as a "discharge strainer", "strainer cross", or "cross") partially visible in FIG. 2. The strainer cross 203a, 203b is connected to the pump discharge and filters solids larger than a predetermined size from the pumped fluid. The bladder saver device of the present disclosure is designed to be mounted between the pulsation dampener 202a, 202b and the strainer cross 203a, 203b.

Figure 3A:
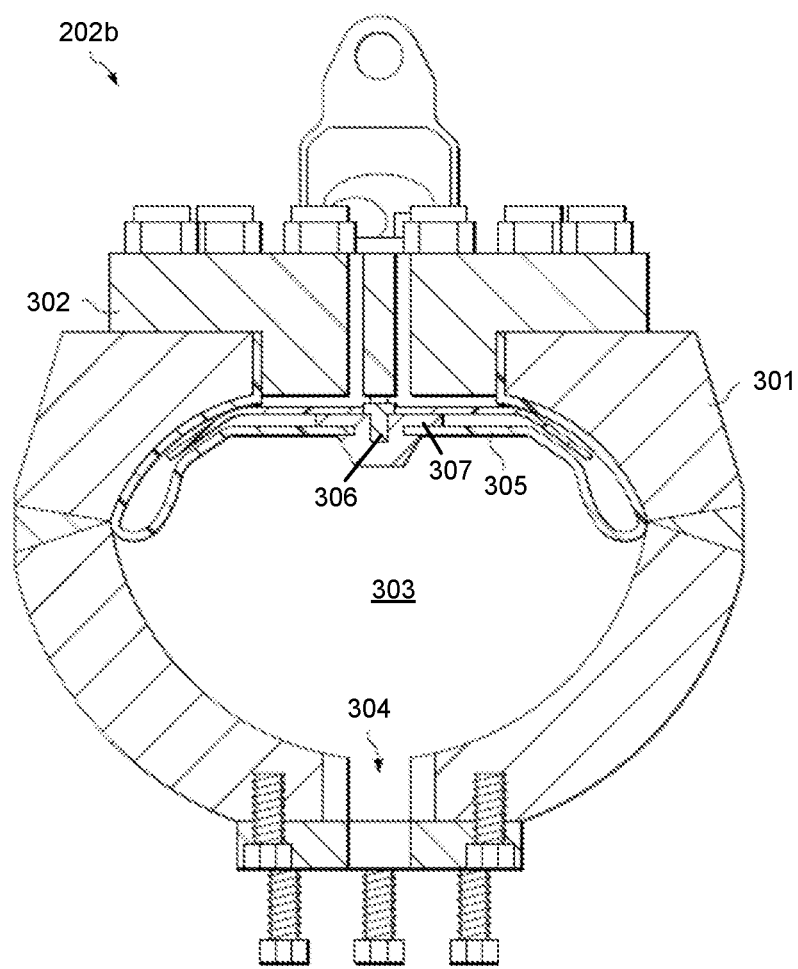
FIG. 3A through 3C depict a gas-charged pulsation dampener.
Figure 3B:
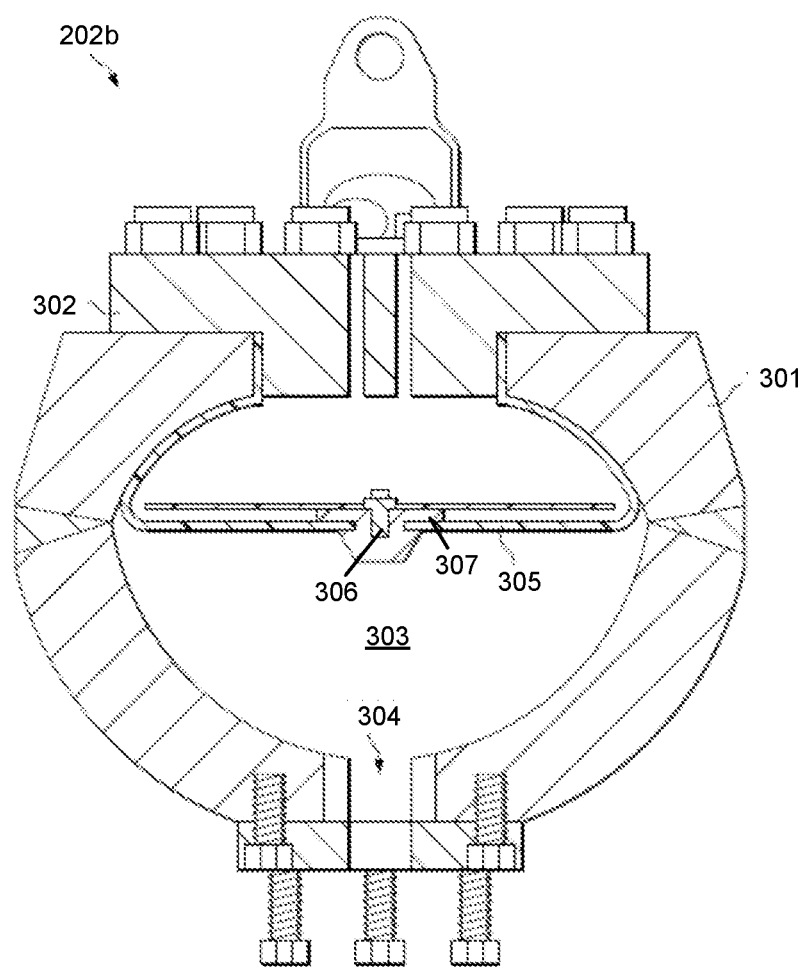
Figure 3C:
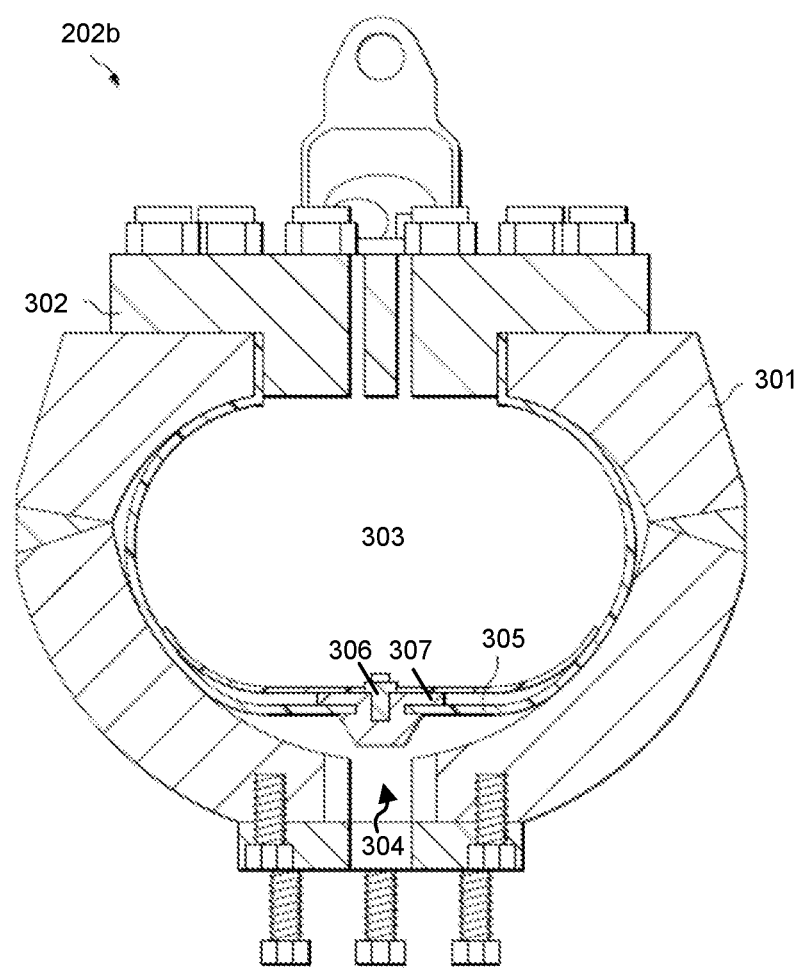

Cross-sections of a gas-charged pulsation dampener are depicted in FIGS. 3A through 3C. As depicted, the gas-charged pulsation dampener 202b includes a housing body 301 having an upper opening receiving and sealed by a cover 302, which combine to form an internal cavity 303 connected to pump system fluid piping (not shown) via a lower opening 304. A flexible internal bladder 305 within the internal cavity 303 is filled with a compressible gas. Fluid from the connected piping enters and/or leaves the cavity 303 via the lower opening 304. The pressure of that fluid and the pressure of the compressible gas within the bladder 305 will cause the lower surface of the bladder 305, which is in contact with the pump system fluid, to shift and the volume occupied by the gas within the bladder 305 to change. High pump fluid pressure will cause the bladder 305 and the gas therein to be substantially compressed into a smaller volume, while mid-range pressure, or transition from high pressure to low pressure, will cause the bladder and its gas to expand into a larger volume and low fluid pressure will allow the bladder 305 and its gas to expand essentially to a maximum volume allowed by the internal cavity 303 of the housing body 301 and cover 302. The compressed gas within the bladder 305 thus acts to absorb pressure pulses within the pump fluid and reduce the peak pressure that may occur. However, the compressed gas must be periodically (e.g., monthly, bi-monthly, quarterly or semi-annually) recharged.

From FIGS. 3A through 3C, the problem of bladder extrusion or damage due to pressure differentials and the potential result of a stuck or failed bladder can be understood. Once the bladder 305 fills the cavity 303, addition differential pressure can cause a portion of the lower surface of the bladder 305 to extrude into the lower opening 304 or fail (e.g., rupture). If the lower portion of the bladder 305 extrudes sufficiently far into the lower opening 304, that portion of the bladder may become stuck and not return back into the cavity 303 when the differential pressure drops. Efforts to prevent a stuck or failed bladder, such as securing a metal insert 306 to the interior of the bladder 305, to retain the bladder 305 inside the cavity, and/or to form (at least a core for) a protrusion on the central region 307 of the bottom surface of the bladder 305, to plug the opening 304, are not always sufficient to avoid a stuck bladder.

Figure 4A:
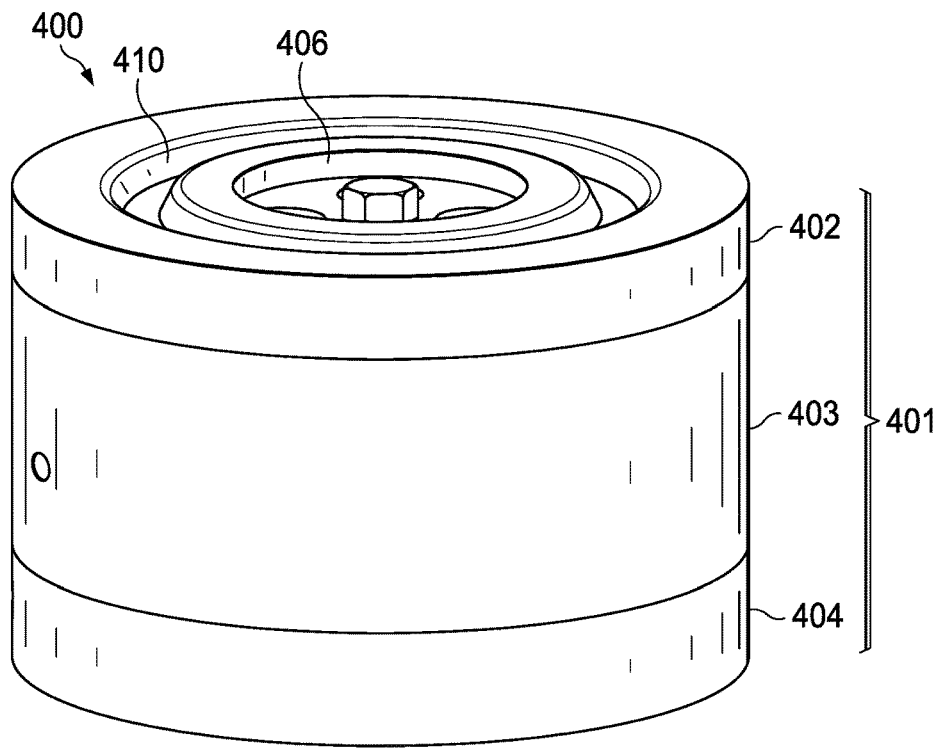
FIGS. 4A through 4D are various views of a bladder saver device in accordance with embodiments of the present disclosure.
Figure 4B:
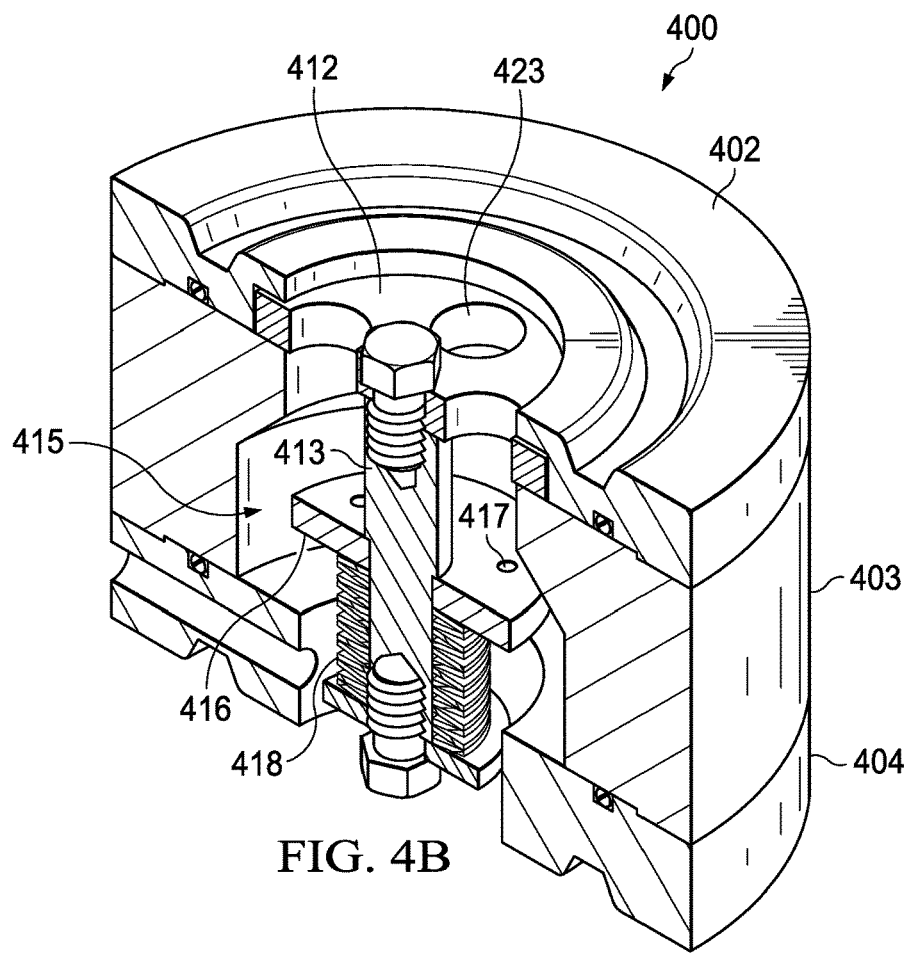
Figure 4C:
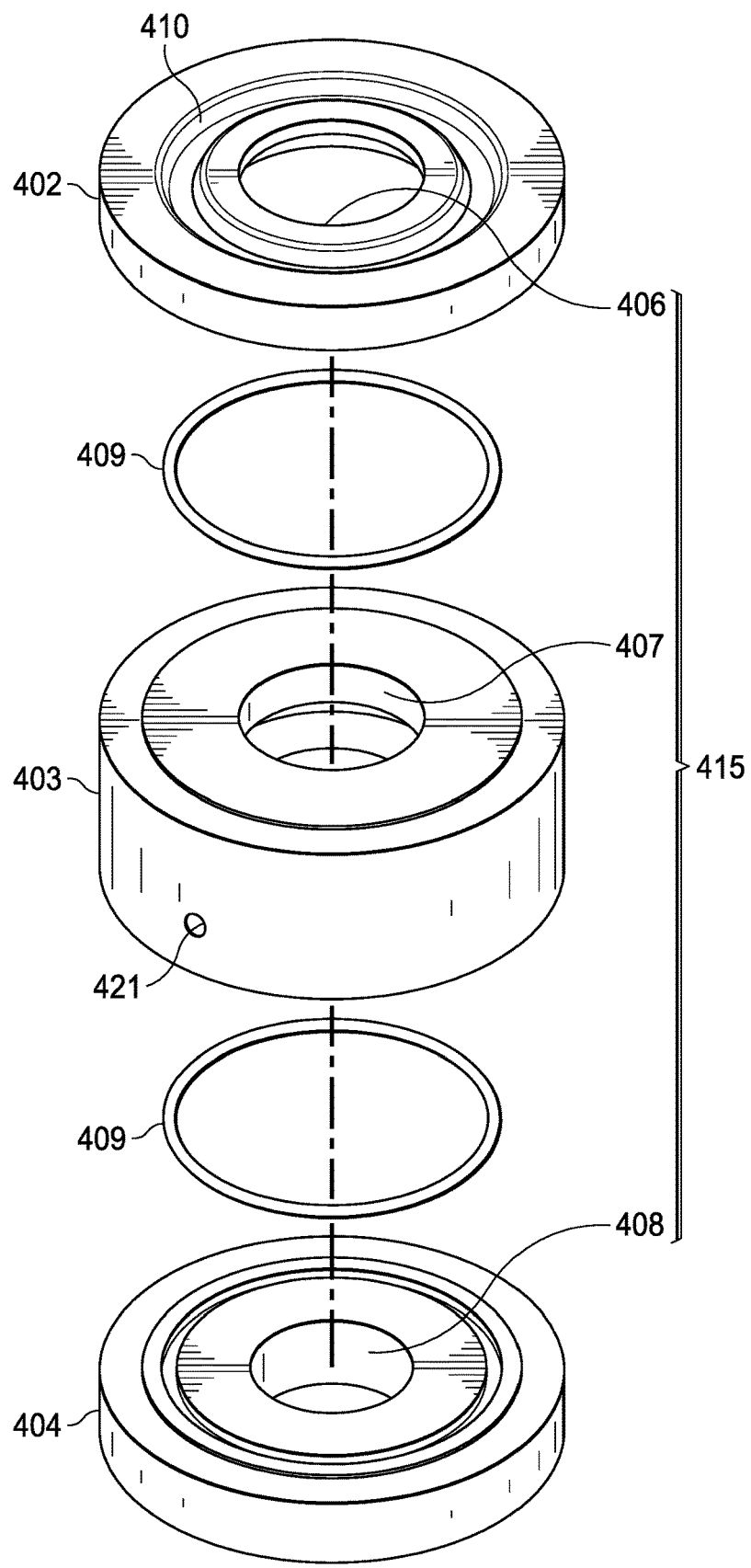
Figure 4D:
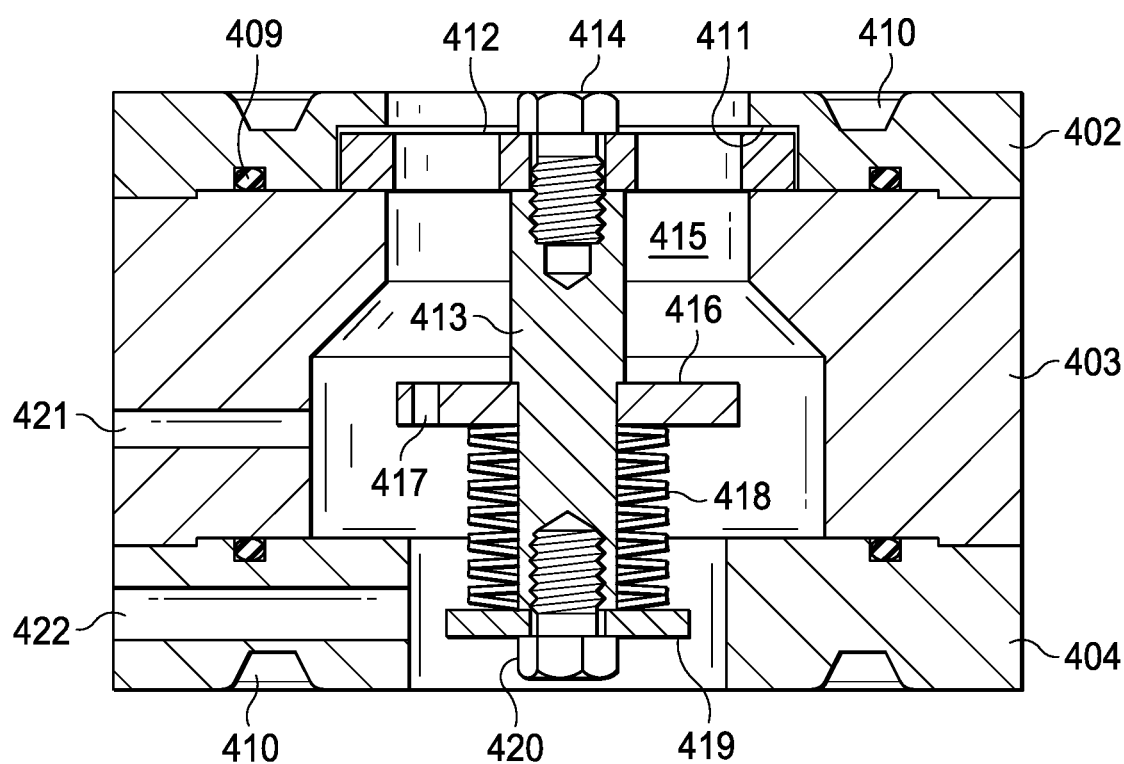

FIGS. 4A and 4B are perspective and cutaway views, respectively, of a bladder saver device 400 for use with gas-charged pulsation dampeners in accordance with various embodiments of the present disclosure. FIG. 4C is an exploded view of a housing 401 of the bladder saver device 400 of FIGS. 4A and 4B, and FIG. 4D is a side sectional view of that bladder saver device 400. The embodiment of the bladder saver device 400 illustrated in FIGS. 4A through 4D is for illustration only. FIGS. 4A through 4D do not limit the scope of this disclosure to any particular implementation.

The exemplary bladder saver device 400 has a generally annular uni-body or tri-body housing 401, with the tri-body form in the embodiment shown including an upper body ring 402, a middle body ring 403 and a lower body ring 404. The upper body ring 402, middle body ring 403 and lower body ring 404 are configured to fit together in a stacked configuration with an open internal passage 405 extending from an upper body opening 406, through a middle body opening 407, and to a lower body opening 408. While illustrated as a hollow cylinder, the shape of the bladder saver device 400 can be altered to be any internal passage 405 through the center of the housing 401 and any external shape of the housing 401. For example, the internal passage 405 could be an oval shape, while the external shape could be rectangular.

In the exploded view of the bladder saver device body of FIG. 4C, O-ring seals 409 between the upper body ring 402 and the middle body ring 403 and between the middle body ring 403 and the lower body ring 404 are visible. A top exterior surface of the upper body ring 402 and the bottom exterior surface of the lower body ring 404 each includes a ring-shaped groove 410 for receiving sealing elements (not shown) to seal the bladder saver device housing 401 respectively against a connection flange of the pulsation dampener 202b above the bladder saver device 400 and a connection flange of the strainer cross below the bladder saver device 400.

As depicted in FIGS. 4B and 4D, the upper body ring 402 has an internal annulus 411 that is larger in diameter than the upper body opening 406 and that is sized to receive a replaceable core including a disk-shaped throat plate 412 having one or more openings 423 extending therethrough, aligned with the upper body opening 406 of the bladder saver device housing 401.

The throat plate 412 may serve to restrict the bladder 305 or diaphragm from extruding into the internal passage 415 bladder saver device housing 401. The throat plate 412 abuts the lower edge of a lip around the upper body opening 406. In some embodiments illustrated by FIG. 4D, the throat plate 412 is held in place by a portion of the upper surface of the middle body ring 403 surrounding the middle body opening 407 through the middle body ring 403. In other embodiments, the throat plate 412 extends into a recessed central region in the upper surface of the middle body ring 403. During use, any portions of the pulsation dampener bladder 305 that extrude through the upper body opening 406 of the bladder saver device housing 401 due to pressure differentials may be blocked from further extrusion by the throat plate 412.

A central shaft 413 is mounted to the throat plate 412. The central shaft 413 extends through the middle body opening 407 of the middle body ring 403. A shaft fastener 414 couples the central shaft 413 to the throat plate 412. The shaft fastener 414 can be integral to the throat plate or a separate component. A top portion of the shaft fastener 414 is below a top surface of the upper body ring 402.

The middle body opening 407 of the internal passage 415 is wider at a bottom of the middle body ring 403 to receive a bleed plate 416 mounted on the central shaft 409. The central shaft 413 and the bleed plate 416 also form part of the replaceable core. The bleed plate 416 includes a plurality of bleed holes 417 for allowing small amounts of fluid to pass through. The bleed holes 417 allow for balancing of forces when the bleed plate 416 is in a restricting position.

The bladder saver device 400 also includes a spring (or spring set) 418. The bleed plate 416 is movable along the central shaft 413 but is spring-biased (e.g., by Belleville washers) toward the throat plate 412. The spring 418 is secured by a spring plate 419. The spring plate 419 is mounted to the central shaft 413 opposite to the throat plate 412 using a spring plate fastener 420. A diameter of the spring plate 419 is small enough to not affect the fluid flow through the internal passage 415, but large enough to fully support the spring 418. The spring plate 419 can also include a plurality of holes or cutouts to reduce any slowing of the fluids passing through the internal passage 415. The spring 418, spring plate 419, and spring plate fastener 420 are also parts of the replaceable core.

At an uppermost limit of movement of the bleed plate 416, fluid entering the bladder saver device housing 401 through the internal passage 415 flows around the bleed plate 416 and may exit the lower body opening 408. If the pressure of the fluid on the bleed plate 416 is greater than the initial tension force of the spring 418, the bleed plate 416 is considered "floating" (that is, at or near the upper limit of movement, or at least away from the lower limit of movement).

When the bleed plate 416 is "floating", fluid can easily flow bidirectionally from the upper body opening 406, past the bleed plate 416, and out the lower body opening 408. A position of the spring 418 relative to the bleed plate 416 can be modified in a manner to be biased open in both flow directions to allow the plate to check against either the upper body ring 402 or the lower body ring 404 and further protecting and enhancing the bladder service life.

At the lowermost limit of movement, the bleed plate 416 abuts an upper surface of the lower body ring 404 and effectively restricts fluid flow through the lower body opening 408. The bleed plate 416 is designed to be at the lowermost limit of movement when a pulsation force that could be damaging to components downstream is sent through the internal passage 415. The bleed plate 416 effectively stops the damaging pulsation. In order to balance the pressure between the middle body opening 407 and the lower body opening 408, fluid is allowed through the bleed holes 417 until pressure equals out. The bleed holes 417 are designed to allow enough fluid through the bleed plate 416 and out of the lower body opening 408 to not cause damage to components operating downstream requiring at least a minimal fluid flow.

The bladder saver device 400 can further include a middle body duct 421 and a lower body duct 422. The middle body duct 421 and a lower body duct 422 can both have measurement instruments attached for measuring properties of the fluid. The middle body duct 421 and the lower body duct 422 can be used to measure different properties or the same properties on different side of the bleed plate 416. When the bleed plate 416 is in the restricting position, the middle body duct 421 could also be optionally used for releasing excess fluid pressure. One or more middle body duct(s) 421 could be implemented for different measurement tools or pressure releasing tools. For example, an over-pressure valve can be mounted on the middle body duct(s) 421 that only releases fluid over a specified pressure, such as an amount of pressure necessary to push the bleed plate 416 to the restricting position.

As discussed above, the bladder saver device 400 can be mounted below the gas-charged pulsation dampener 202b, with the lower opening 304 aligned with the upper body opening 406, and above the strainer cross as the pump discharge outlet. Simply by using longer studs, the wafer-type bladder saver device 400 of FIGS. 4A through 4D or FIGS. 6A and 6B may be installed in between the connection flanges for a standard pulsation damper to strainer cross connection—for example, a 4 1/16" American Petroleum Institute (API) 10K (10,000 pounds per square inch) connection. The components of the bladder saver device 400 may be formed of forged materials. As the design of the bladder saver device 400 is considered "pressure containing," production scale units may be manufactured using American Society of Mechanical Engineers (ASME) Section VIII Division 1 or Division 2 materials—for example, 4 1/16" 5,000 pounds per square inch (PSI), ring type joint (RTJ) (R-39) carbon steel, 4 1/16" 10,000 PSI RTJ (BX-155) carbon steel, or stainless steel "sandwich" type materials.

During operation, the bladder saver device 400 offers an uninterrupted flow path for a conventional bladder-type pulsation dampener, allowing for good pulsation control and signal detection during steady state and non-upset drilling conditions. Should there be a sudden and dramatic system pressure drop of sufficient magnitude occurring between the pulsation dampener and the pump system, such that the pulsation dampener experiences a sudden down-rush (siphoning) of fluid out of the pulsation dampener, the differential fluid pressure across the bleed plate 416 will overcome the resistance of the springs such that the bleed plate 416 seats on the lower body ring 404 to slow fluid flow out of the internal passage 415 in the bladder saver device housing 401. The bleed plate 416, pressing against neutral acting spring 418 or springs, interrupts the fluid flow out of the bladder saver device 400 (and the pulsation dampener 202b) and allows the system to equalize by allowing the trapped fluid to be retained by and/or bleed back into the strainer cross and discharge line 112 until the system regains equilibrium. The interruption in fluid flow prevents significant damage when the bladder 305 seats against to the dampener bottom plate or lower opening 304 and reduces the likelihood of a stuck bladder.

Figure 5A:
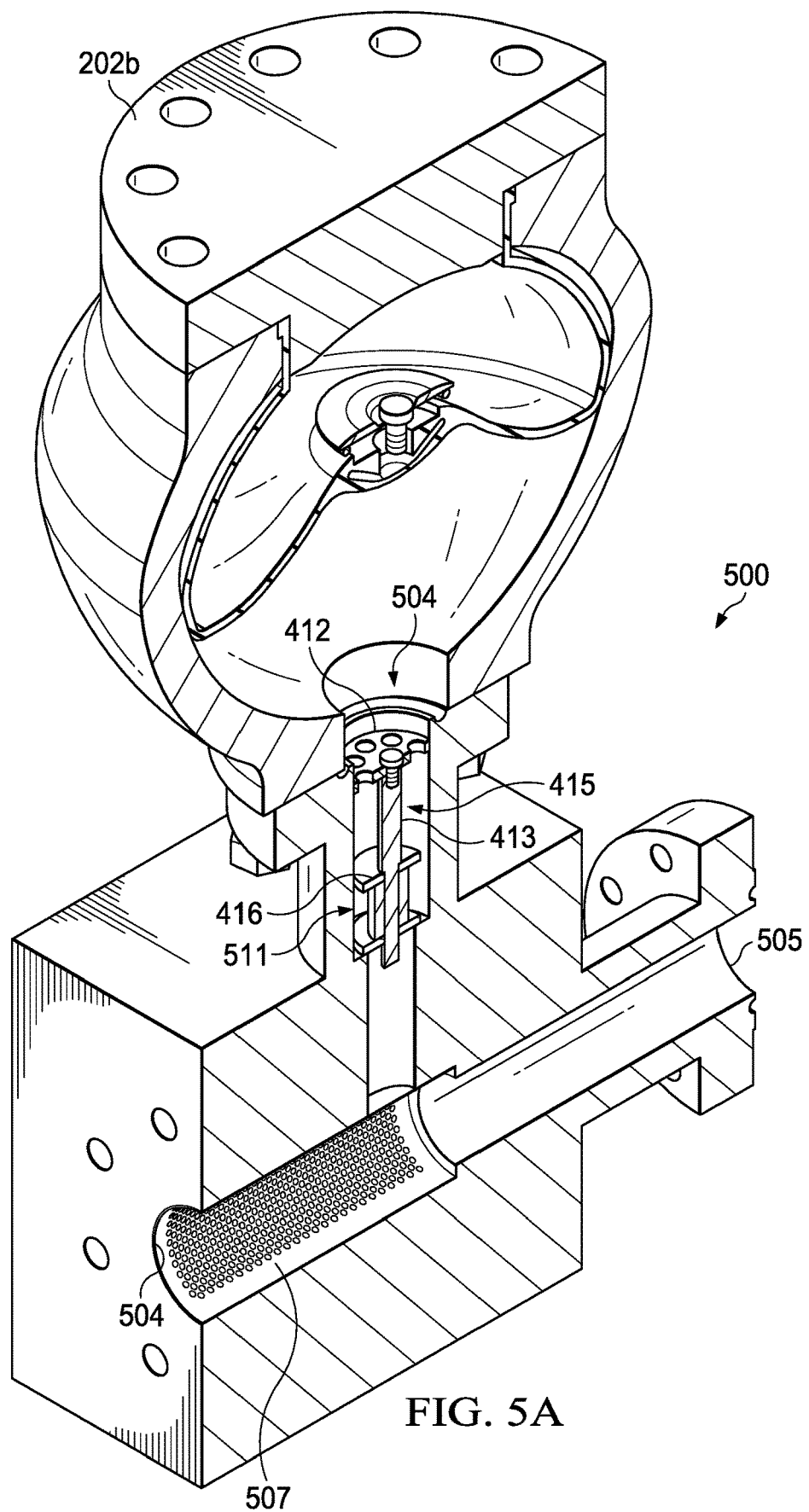
FIGS. 5A and 5B are perspective cutaway and side views, respectively, of a bladder saver device integrated into a strainer cross in accordance with embodiments of the present disclosure.
Figure 5B:
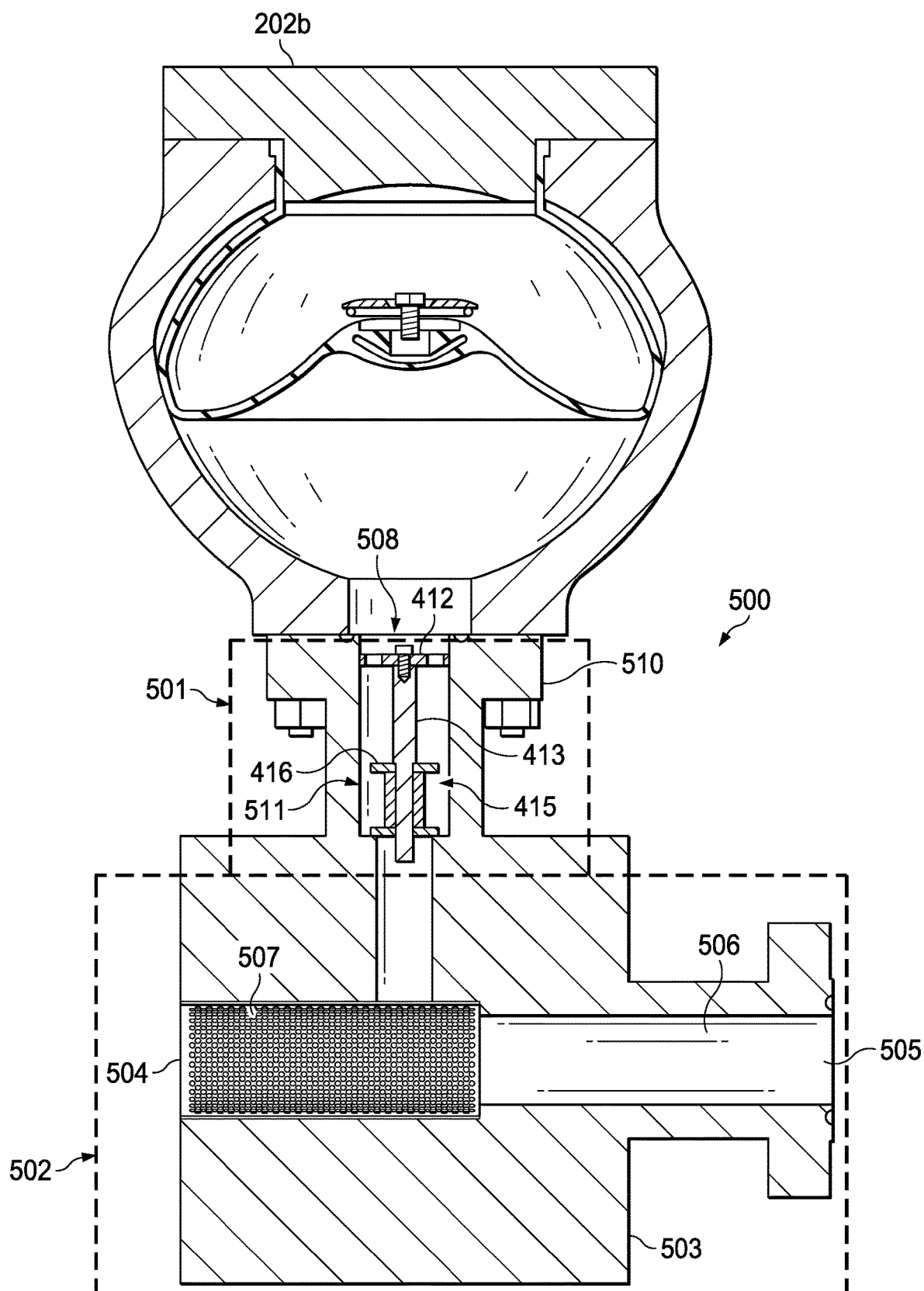

FIGS. 5A and 5B are perspective cutaway and side views, respectively, of an integrated bladder saver device 500 where the bladder saver is integrated into a strainer cross in accordance with embodiments of the present disclosure. The embodiment of the integrated bladder saver device 500 illustrated in FIGS. 5A and 5B is for illustration only. FIGS. 5A and 5B do not limit the scope of this disclosure to any particular implementation.

In addition to the wafer style design of FIGS. 4A through 4D and FIGS. 6A and 6B, the bladder saver device may be formed with a bladder saver portion 501 integrated with a strainer-cross portion 502. As known in the art, a strainer-cross may be mounted at the outlet of a pump, between the pump outlet and piping for carrying pumped fluid downstream and with a connection on which a pulsation dampener 202b is mounted. The strainer-cross portion 502 of the integrated bladder saver device 500 includes a body 503 having an upstream opening 504 for upstream connection to a pump outlet and a downstream opening 505 for connection to downstream piping, where the two openings 504, 505 are in fluid communication with each other, by a fluid passage 506. One or both of openings 504, 505 may be surrounded by a flange or studded outlet for bolted connection to the respective pumping system component. A perforated strainer 507 extends at least part of the way between the upstream opening 504 and the downstream opening 505, filtering solids larger than the perforation openings from the fluid pumped downstream.

The bladder saver portion 501 of the integrated bladder saver device 500 also includes a top opening 508 to a cross fluid passage 509 in fluid communication with the fluid passage 506 between the openings 504 and 505. The top opening 508 is in fluid communication with the internal opening 304 of a bladder-type pulsation dampener 202b and may be surrounded by a flange 510 on which the pulsation dampener 202b may be mounted. Below the opening 508 is an internal passage 511 within which are installed a throat plate 412, central shaft 413, and spring-biased bleed plate 416 having the structure and function of the corresponding components in FIGS. 4A through 4D. The bladder-saver portion 501 is thus mounted within a cross portion of the cross-strainer portion 502 of the integrated bladder saver device 500, and function in the manner discussed above for the wafer-type bladder saver device 400.

Although illustrated in the figures within a wafer-type housing for mounting below a pulsation dampener at the pump outlet or integrated into a strainer-cross on which a pulsation dampener is mounted, the core functional components of the bladder saver device may be placed anywhere—horizontally or vertically—along the drilling mud line. Regardless of where located, the inhibition or limiting of pressure surges by the bleed plate will mitigate the effect of such surged on the bladder in pulsation dampeners. In addition, while particularly beneficial in the context of drilling for the reasons mentioned above, the bladder saver device may be used in other pumping scenarios.

As a significant safety addition, external side porting in the bladder saver device may be provided to allow a technician to determine any trapped pressure in the pulsation dampener before initiating any service work. Additionally, while the designs described above are unidirectional, a bidirectional design may be achieved with readily apparent modification to protect the pulsation dampener bladder from both cratering against the bottom connection and/or plate due to dramatic fluid outflow and repeated impact against the roof of the pulsation dampener (cover plate) due to dramatic fluid inflow.

The bladder saver device is designed to prevent the sudden or cyclic impact of the bladder on pulsation dampener surfaces by slowing the bladder movement. The bladder is therefore prevented from crashing into surfaces of the pulsation dampener or extruding through the pulsation dampener outlet due to hard stops on mud pumps or and fluid surge cycling during drilling operation, avoiding significant damage and thereby achieving a longer bladder service life. Improving bladder service life will reduce pulsation dampener field service cost, reduce rig down time, and increase drilling efficiencies and operational safety.

Figure 6A:
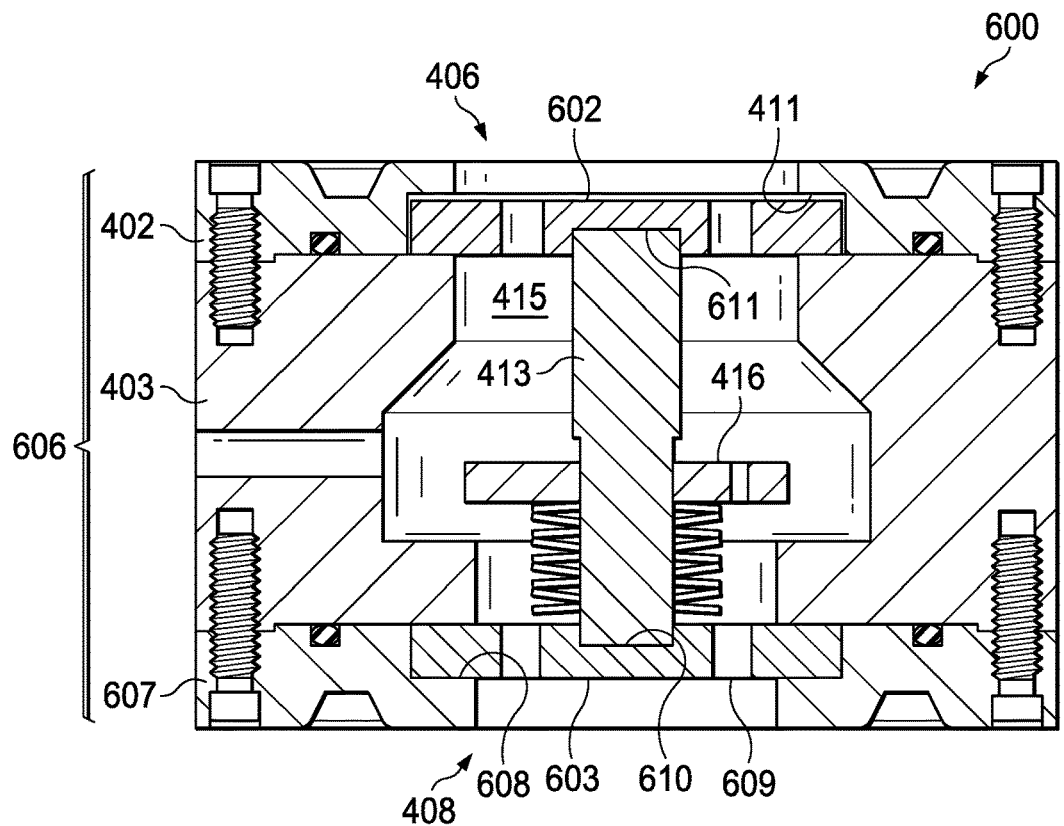
FIGS. 6A and 6B are bladder saver devices in accordance with embodiments of the present disclosure.
Figure 6B:
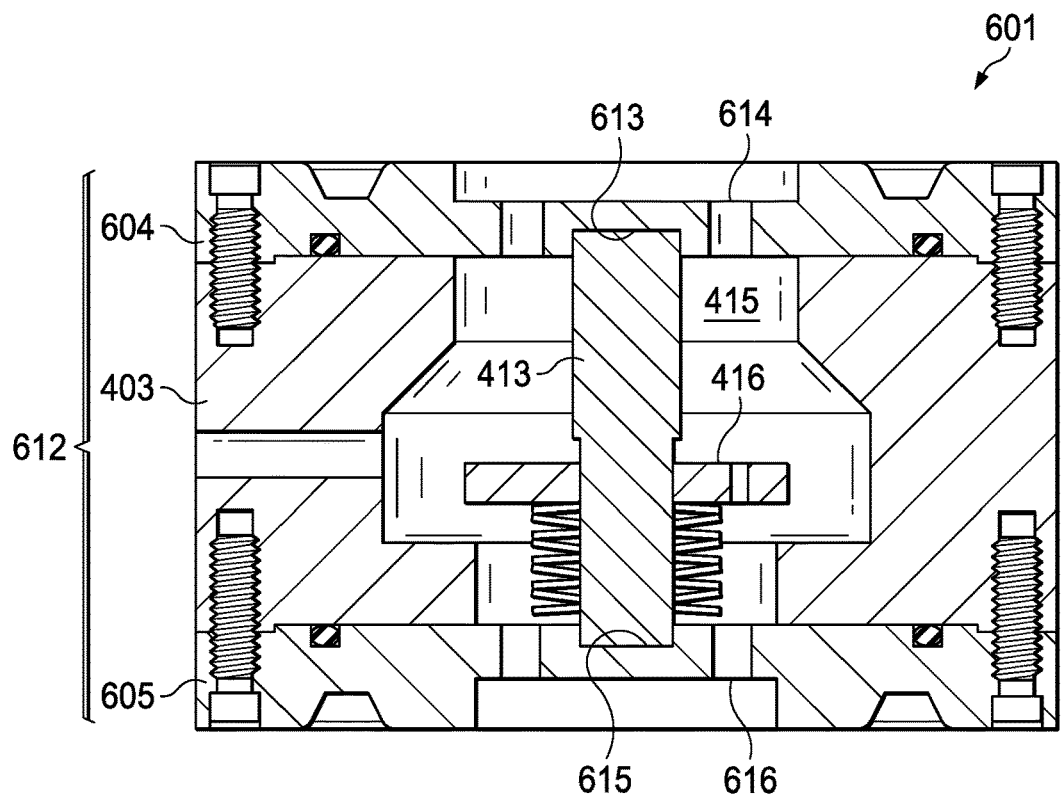

FIGS. 6A and 6B are bladder saver devices 600, 601 in accordance with embodiments of the present disclosure. In particular, FIG. 6A illustrates an example bladder saver device 600 with a central shaft 413 mounted without additional fasteners 414, 420 between a throat plate 602 and a spring plate 603 and FIG. 6B illustrates an example bladder saver device 601 with a central shaft 413 mounted without additional fasteners 414, 420 between an upper body ring 604 and a lower body ring 605. The embodiment of the integrated bladder saver devices 600 and 602 illustrated in FIGS. 6A and 6B are for illustration only. FIGS. 6A and 6B do not limit the scope of this disclosure to any particular implementation.

The bladder saver device 600 has a similar housing 606 to housing 401 but includes a modified lower body ring 607 with the upper body ring 402 and middle body ring 403. The lower body ring 607 is similar to the lower body ring 404 shown in FIGS. 4A-4D but includes a lower internal annulus 608. The lower internal annulus 608 is similar to the internal annulus 411 but reversed to support the spring plate 603.

The spring plate 603 is wide enough to cover the entire lower body opening 408. To accommodate the fluid flow, the spring plate 603 includes a plurality of holes 609. In certain embodiments, the spring plate 603 could be in a shape of a bar in a manner that the bar extends to the lower internal annulus 608 but the fluid flow can go around the spring plate 603. Because the spring plate 603 is supported by the internal annulus 608, the central shaft 413 can be supported by sitting in a spring plate seated portion 610 of the spring plate 603. The throat plate 602 also has a throat plate seated portion 611 to maintain alignment and restrict movement of the central shaft 413. The seated portions 610 and 611 maintain the central shaft 413 inside the internal passage 415 without fasteners on connected to the central shaft 413.

As shown in FIG. 6B, the bladder saver device 601 has a housing 612 with an upper body plate 604, a center body ring 403, and a lower body plate 605. The upper body plate 604 is similar to the upper body ring 402 shown in FIGS. 4A-4D with the integration of the throat plate 412. The upper body plate 604 includes an upper seating 613 and upper holes 614. The upper seating 613 is a counter bore in the upper body plate 604 for mounting the central shaft 413 without additional fasteners. The upper holes 614 allow fluid to flow through the upper body plate 604 into the internal passage 415 in the middle body ring 403.

The lower body plate 605 extends across an entire lower portion of the housing 612. The lower body plate 605 includes a lower seating 615 for supporting the central shaft 413 and lower holes for allowing fluid to exit from the internal passage 415 through the lower body plate 605. When the upper body plate 604 and the lower body plate 605 are combined with the middle body ring 403, the central shaft 413 is fixed in place within the internal passage 415.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A device for use with a bladder-type pulsation dampener, the device comprising:
   a housing that includes an internal passage for a pulsated fluid flow, wherein the housing is formed of an upper body ring with an internal annulus, a middle body ring, and a lower body ring;
   a bleed plate mounted within the internal passage and movable, in response to increasing fluid pressure of fluid flowing through the internal passage, between a first position in which the pulsated fluid flow through a fluid outlet for the internal passage is least encumbered by the bleed plate and a second position in which the pulsated fluid flow through the fluid outlet is restricted by the bleed plate, wherein the bleed plate includes a plurality of holes to allow equalization of pressure through the internal passage when a fluid pressure of the pulsated fluid flow causes the bleed plate to move into the second position;
   a central shaft coupled to the housing and extending through the internal passage, wherein the bleed plate floats around the central shaft between the first position and the second position; and a throat plate coupled to the central shaft, wherein the throat plate is fixed within the housing in a space defined by the internal annulus and an outer surface of the middle body ring.

2. The device of claim 1, further comprising:
one of a spring or spring set mounted between the housing and the bleed plate to bias the bleed plate into the first position.

3. The device of claim 2, wherein, when the bleed plate is in the second position, the biasing of the bleed plate is configured to move the bleed plate from the second position toward the first position after the fluid pressure associated with the fluid flow drops below a compression force of the spring.

4. The device of claim 1, wherein:
the bleed plate covers an outlet for the internal passage in the housing in the second position, and
the throat plate restricts extrusion of a bladder for the pulsation dampener into the internal passage.

5. The device of claim 1, wherein the lower body ring includes a lower internal annulus.

6. The device of claim 5, further comprising:
a spring plate supporting the central shaft in a seated portion of the spring plate.

7. The device of claim 6, wherein the spring plate is fixed within the housing in a space defined by the lower internal annulus and a surface opposite the outer surface of the middle body ring.

8. The device of claim 1, wherein
the central shaft is fixed within the internal passage between the upper plate seating and the lower plate seating.

9. A system, comprising:
a strainer cross coupled to a pump discharge to filter large particles;
a bladder saver device coupled to the strainer cross to be in fluid communication with a cross fluid passage of the strainer cross, the bladder saver device includes:
a housing that includes an internal passage for a pulsated fluid flow, wherein the housing is formed of an upper body ring with an internal annulus, a middle body ring, and a lower body ring,
a bleed plate mounted within the internal passage and movable, in response to increasing fluid pressure of fluid flowing through the internal passage, between a first position in which the pulsated fluid flow through a fluid outlet for the internal passage is least encumbered by the bleed plate and a second position in which the pulsated fluid flow through the fluid outlet is restricted by the bleed plate,
a central shaft coupled to the housing and extending through the internal passage, wherein the bleed plate floats around the central shaft between the first position and the second position, and
a throat plate coupled to the central shaft, wherein the throat plate is fixed within the housing in a space defined by the internal annulus and an outer surface of the middle body ring; and
a pulsation dampener coupled to the bladder saver device to be in fluid communication with the internal passage, wherein the bleed plate includes a plurality of holes to allow equalization of pressure through the internal passage when a fluid pressure of the pulsated fluid flow causes the bleed plate to move into the second position.

10. The system of claim 9, further comprising:
a spring mounted between the housing and the bleed plate to bias the bleed plate into the first position.

11. The system of claim 10, wherein, when the bleed plate is in the second position, the biasing of the bleed plate is configured to move the bleed plate from the second position toward the first position after the fluid pressure associated with the fluid flow drops below a compression force of the spring.

12. The system of claim 9, wherein:
the bleed plate covers an outlet for the internal passage in the housing in the second position,
the plurality of holes provide a reduced rate of expansion for a bladder of the pulsation dampener from a rate of expansion of the bladder when the bleed plate is in the first position, and
the throat plate restricts extrusion of the bladder into the internal passage.

13. The system of claim 9, wherein the lower body ring includes a lower internal annulus.

14. The system of claim 13, further comprising:
a spring plate supporting the central shaft in a seated portion of the spring plate.

15. The system of claim 14, wherein the spring plate is fixed within the housing in a space defined by the lower internal annulus and a surface opposite the outer surface of the middle body ring.

16. The system of claim 14, wherein the pulsation dampener comprises:
a housing body with an internal chamber and a lower opening from the internal chamber in fluid communication with the internal passage of the bladder saver device; and
a bladder located within the internal chamber and filled with a compressible gas to reduce pressure pulsations from fluid entering the internal chamber through the lower opening, and
the throat plate is positioned within the housing to prevent the bladder from entering a pulsation chamber of the bladder saver device.

17. The system of claim 9, wherein
the central shaft is fixed within the internal passage between the upper plate seating and the lower plate seating.

18. An integrated bladder saver device for use with a bladder-type pulsation dampener, the integrated bladder saver device comprising:
a strainer cross portion coupled to a pump discharge to filter large particles;
a bladder saver portion extending from the strainer cross portion to be in fluid flow with a cross fluid passage of the strainer cross portion, the bladder saver portion includes:
a housing that includes an internal passage for a pulsated fluid flow, wherein the housing is formed of an upper body ring with an internal annulus, a middle body ring, and a lower body ring,
a bleed plate mounted within the internal passage and movable, in response to increasing fluid pressure of fluid flowing through the internal passage, between a first position in which the pulsated fluid flow through a fluid outlet for the internal passage is least encumbered by the bleed plate and a second position in which the pulsated fluid flow through the fluid outlet is restricted by the bleed plate, wherein the bleed plate includes a plurality of holes to allow equalization of pressure through the internal passage when a fluid pressure of the pulsated fluid flow causes the bleed plate to move into the second position, a central shaft coupled to the housing and extending through the internal passage, wherein the bleed plate floats around the central shaft between the first position and the second position, and a throat plate coupled to the central shaft, wherein the throat plate is fixed within the housing in a space defined by the internal annulus and an outer surface of the middle body ring.

19. The integrated bladder saver device of claim 18, further comprising:

one of a spring or spring set mounted between the housing and the bleed plate to bias the bleed plate into the first position.

20. The integrated bladder saver device of claim 18, wherein:

the bleed plate covers an outlet for the internal passage in the housing in the second position, and the throat plate restricts extrusion of a bladder for the pulsation dampener into the internal passage.

\* \* \* \* \*